United States Patent [19]

Ta et al.

[11] Patent Number: 5,430,498
[45] Date of Patent: Jul. 4, 1995

[54] SELECTIVE INTERMODULATION CORRECTION SYSTEM

[75] Inventors: Hong A. Ta, Montlignon, France; Raymond C. Kiesel, Lansdale, Pa.

[73] Assignee: Comark Communications, Inc., Colmar, Pa.

[21] Appl. No.: 203,320

[22] Filed: Mar. 1, 1994

[51] Int. Cl.⁶ .............................................. H04N 5/40
[52] U.S. Cl. .................................. 348/608; 348/723
[58] Field of Search ............... 332/159, 160, 162, 161; 348/608, 607, 723, 724, 470, 484; 455/295, 296, 63; H04N 5/40, 5/38, 5/21

[56] References Cited

U.S. PATENT DOCUMENTS

| | | |
|---|---|---|
| 3,135,827 | 6/1964 | DiNardo . |
| 4,237,485 | 12/1980 | Saito et al. . |
| 4,322,746 | 3/1982 | Oguino . |
| 4,496,979 | 1/1985 | Yu et al. . |
| 4,518,997 | 5/1985 | Beckman . |
| 4,538,180 | 8/1985 | Cluniat ................. 348/608 |
| 4,591,915 | 5/1986 | Davidov et al. . |
| 4,602,288 | 7/1986 | Everett . |
| 4,623,921 | 11/1986 | Schmitz et al. . |
| 4,672,452 | 6/1987 | Corbel et al. ........ 348/608 |
| 4,716,464 | 12/1987 | Parker . |

FOREIGN PATENT DOCUMENTS

| | | |
|---|---|---|
| 3306562A | 8/1984 | Germany . |
| 54-98119 | 8/1979 | Japan . |
| 55-53977 | 4/1980 | Japan . |
| 59-51676 | 3/1984 | Japan . |
| 59-51677 | 3/1984 | Japan . |

OTHER PUBLICATIONS

"Intercarrier Buzz Phenomena Analysis and Cures" by Pieter Fockens and Carl G. Eilers IEEE Transactions on Consumer Electronics, vol. CE-27, No. 3, Aug. 1981.

"Aural/Visual Multiplex Operation of Klystron-Type UHF Television Transmitters" by Ronald W. Zborowski, Mar. 1981.

Primary Examiner—James J. Groody
Assistant Examiner—David E. Harvey
Attorney, Agent, or Firm—Oblon, Spivak, McClelland, Maier & Neustadt

[57] ABSTRACT

A selective intermodulation correction system which can correct for in-band intermodulation products which are formed in a high end of a video sideband region generated in the common amplification of a television signal. The selective intermodulation correction system operates to generate an intermodulation product which is equal in amplitude but opposite in phase to in-band intermodulation products formed at the high end of the video sideband region. By combining such a signal to a conventionally corrected television signal, the in-band intermodulation products formed in the high end of the video sideband region can be cancelled.

15 Claims, 7 Drawing Sheets

SELECTIVE INTERMODULATION CORRECTION SYSTEM

BACKGROUND OF THE INVENTION

1. Field of the Invention

The present invention is directed to reducing in-band intermodulation products of a television amplification signal.

2. Discussion of the Background

In the transmission of television signals, transmitters typically emit signals of several frequencies at the same time, see for example FIGS. 1(a) and 1(b), such as a visual-carrier frequency, a color sub-carrier frequency and various sideband frequencies (vision content) as well as one or two sound-carrier frequencies. If the visual and sound carrier signals are amplified together, intermodulation between the individual frequencies produces additional sum and difference frequencies. Although these interfering frequencies have the same origins, intermodulation (IM) products are generated.

Such intermodulation products occur when there is a joint amplification of the visual and sound carrier signals in a non-linear amplifier. This operation is shown in FIGS. 1(a) and 1(b) which show intermodulation (IM) products being formed about the visual carrier and sound carrier in a television transmission channel which has a Sound carrier, color carrier and visual carrier. As shown in FIG. 1(a), the IM products formed about the visual carrier are formed on both sides of the visual carrier (plus and minus) and are separated from the visual carrier by a frequency equal to the absolute value of the difference in frequency between the sound carrier and color carrier. As a result, if the color carrier (in a test function) decreases in frequency (moves to the left in FIG. 1(a)), the frequency of the IM products will move away from the visual carrier, as represented by the arrows in FIG. 1(a). As one example, the visual carrier will typically be at a frequency of 471.25 MHz, the color carrier at a frequency of 474.83 MHz, and the sound carrier at a frequency of 475.75 MHz, and therefore the resulting IM products will be formed at frequencies of 0.92 MHz above and below the visual carrier.

Further, as is shown in FIG. 1(b), when a visual carrier is modulated by modulating signals, IM products are also formed in the area of the sound carrier, only the lower such IM product being shown in FIG. 1(b). This IM product formed in the area of the sound carrier will be a result of an interaction between the modulating signals and the visual carrier. This IM product formed in the area of the sound carrier will be separated from the sound carrier by a frequency equal to the absolute value of the difference in frequency between the visual carrier and the modulating signal. For example, if the visual carrier is at a frequency of 471.25 MHz, the sound carrier is at a frequency of 475.75 MHz, and the modulating signals are at frequencies of 0.5 MHz above and below visual carrier, then the IM product shown in FIG. 1(b) will be at a frequency of 475.25 MHz, which is 0.5 MHz below the sound carrier.

In this way, when any combination of multiple carriers is amplified in a non-linear device, various intermodulation products are developed. In the case of common amplification of a complete television signal package (visual, color and sound carriers and modulation sidebands), intermodulation products appearing both within band and out-of-band are produced.

It is known how to remove out-of-band intermodulation products. To remove such out-of-band intermodulation products, notch filters or bandpass structures can be used to limit the energy levels of such out-of-band intermodulation products.

However, such conventional filtering cannot work to effectively remove the in-band intermodulation products as the in-band intermodulation products appear in a spectrum that also contains significant side band energy developed in the normal modulation process and which is needed by a television receiver for complete video demodulation.

Therefore, dealing with in-band intermodulation products is much more difficult. More particularly, in-band intermodulation products cannot be limited by conventional filtering methods. Conventionally, the correction of in-band intermodulation products is accomplished by circuitry that provides effective correction for intermodulation products (pre-distortion) close to the visual carrier only, i.e., without regard to the higher products. Such conventional intermodulation correction circuitry is deficient in that it does not effectively correct for intermodulation in-band products at higher frequency (video) areas of the passband because those products can have different phase characteristics than the pre-correction products as a result of phase non-linearities in the amplifiers. Such conventional intermodulation correction circuitry uses low frequency linearity and incidental carrier phase modulation (ICPM) techniques.

More particularly, conventional techniques for IM reduction are to pre-distort the low level signal package through a controlled non-linearity. This technique creates IM products equal in amplitude, but Opposite in phase, i.e. 180° out of phase, to those created in the high power amplifier. Thus, the offending IM products are cancelled out.

Conventional IM cancellation techniques rely on the fact that the IM products are created by fixed frequency signals and, thus, always appear at the same frequencies. That is, since the IM products are formed by an interaction of the visual, color and sound carriers, which are always at the same known frequencies, the IM products will also always appear at the same known frequencies. To cancel such IM products then, complementary IM cancellation products, i.e. IM products equal in amplitude and of opposite phase, are formed at the known frequencies. This technique can be called narrow band IM correction and it is the technology used by most common amplification transmitters in manufacture today.

In testing for the cancellation IM products, one can vary the frequency of the color carrier across the full signal bandwidth, resulting in the corresponding IM products also changing frequency, as shown by the arrows in FIG. 1(a). This varying color carrier effectively generates the in-band IM cancellation products out of phase with the generated IM products in certain regions. However, the phase of the IM products across the band will vary as a result of phase non-linearities in the high power amplifiers used prior to transmission of the television signals. Thus, the carefully created cancellation ratios between amplitude and phase become subject to the variations in the amplifier's phase and gain response across the band. This tends to destroy the IM cancellation and results in the situation shown in FIG. 2. FIG. 2 shows amplitudes (locus) of IM products across a television signal bandwidth. As Shown in FIG. 2, IM products will be generated at a higher amplitude in the region of the color and sound carriers. These IM products generated in the region of the color and sound carriers are not effectively cancelled as a result of their amplitudes. In fact, with enough phase shift the IM products can become enhanced.

SUMMARY OF THE INVENTION

Accordingly, one object of the present invention is to provide a novel selective intermodulation correction system which allows independent correction of in-band intermodulation products that appear in the high end of the video sideband region.

Accordingly, another object of the present invention is to provide a novel selective intermodulation correction system which thereby operates across an entire television channel bandwidth.

Further, such a selective intermodulation correction system of the present invention allows transmitters to be produced which can still use a common amplification technique, while still maintaining intermodulation specifications at acceptable levels across the full video bandwidth.

To achieve these objectives, the device of the present invention is directed to an intermodulation correction system. According to the present invention, an input video carrier signal is modulated with at least one modulating signal (complex, wide band) and is combined with an input sound carrier signal. The resulting signal is then amplified by a transmitter amplifier chain, which thereby results in IM products being formed about the sound carrier signal at predetermined frequencies from an interaction of the video carrier signal, modulating signals and sound carrier signal. A correcting means generates an IM cancellation signal at the predetermined frequencies which has an equal amplitude as the generated IM product.

Furthermore, according to the present invention, a low pass filter also receives the input video carrier signal and low pass filters the input video Carrier signal. An amplifier then amplifies the low-pass filtered video signal which is output from the low pass filter, the amplifier having a non-linearity which simulates the non+linearity of the transmitter amplifier chain's phase non-linearity. The output of this video amplifier is then input into a phase modulator, as is the IM cancellation signal. The phase modulator then phase shifts the IM cancellation signal based on the signals output from the video amplifier, so that the IM cancellation signal is opposite in phase to the generated IM product, which thereby provides the results that the IM cancellation signal when combined with the generated IM product cancels out the generated IM product.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1A:
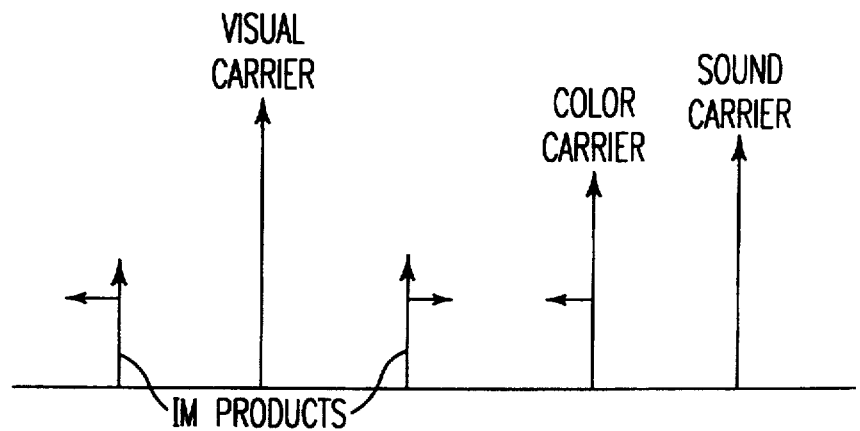
FIGS. 1(a) and 1(b) show the generation of IM products in a television signal amplification process.
Figure 1B:
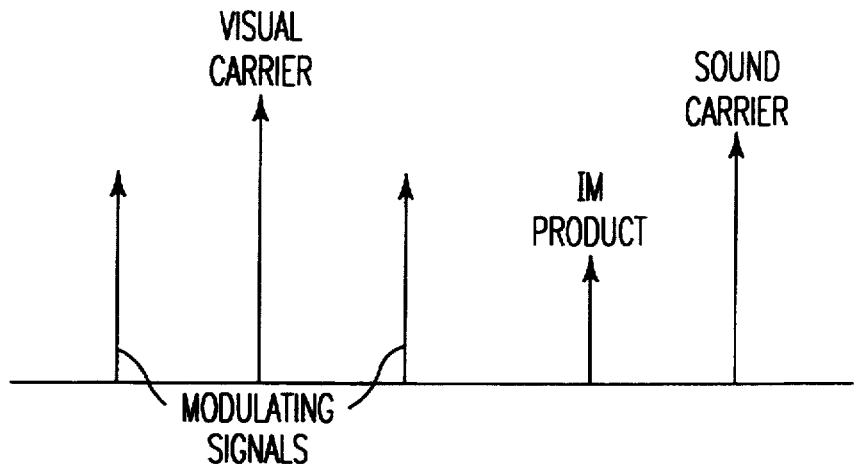
Figure 2:
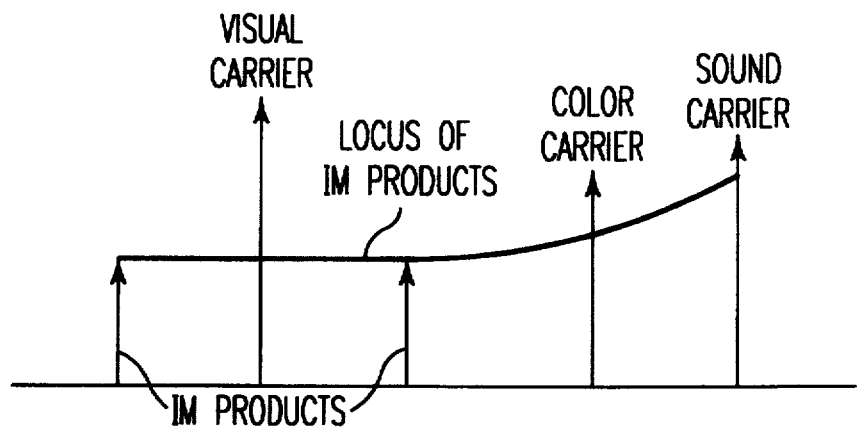
FIG. 2 shows the amplitudes of generated IM products throughout the television channel.
Figure 3:
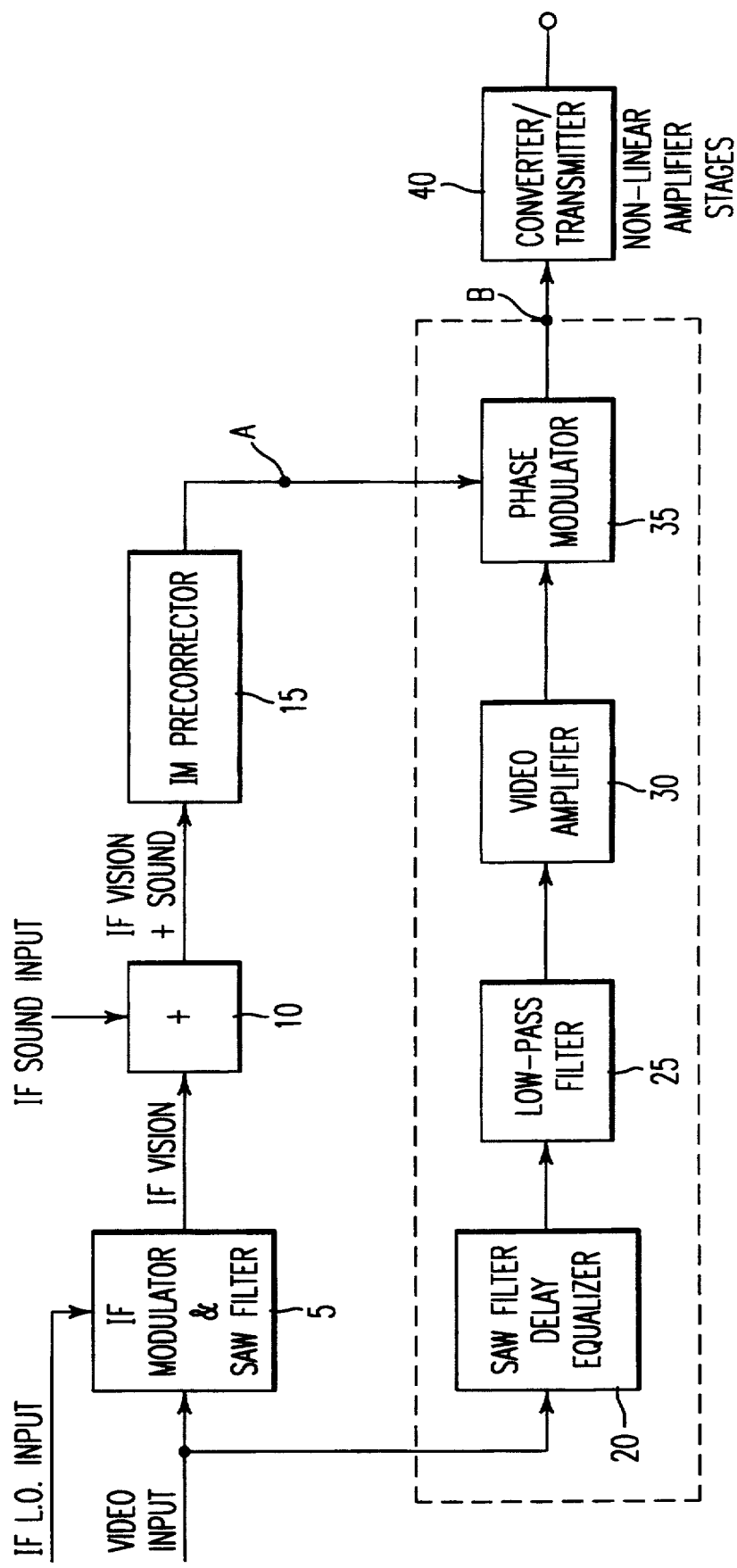
FIG. 3 shows a first embodiment of the intermodulation correction system of the present invention.

Referring now to the drawings, wherein like reference numerals designate identical or corresponding parts throughout the several views, and more particularly to FIG. 3 thereof, there is shown a first embodiment of the intermodulation correction system of the present invention. The intermodulation correction system shown in FIG. 3 is to be incorporated into conventional television transmitter systems.

As shown in FIG. 3, a video input signal to be transmitted, which includes a video baseband and a color sub-carrier, is input into an IF (intermediate frequency) Modulator and SAW (Surface Acoustic Wave) Filter 5. Also input into this IF Modulator and SAW Filter 5 is a IF L.O. (local oscillator) input. The output of this IF Modulator and SAW Filter 5 is a resulting IF visual carrier signal and its modulating signals, which is then input into a summator 10. Another input of this summator 10 is the IF sound carrier input signal to be transmitted along with the visual input signal. As a result, the signal output of the summator 10 is an IF visual, color and sound signal. This IF visual, color and sound signal is then input into IM Precorrector 15. This combination of elements of the IF Modulator and SAW Filter 5, summator 10 and IM Precorrector 15 represents the conventional correction system which is applied to a television signal. This conventional correction system operates to generate IM cancellation products as shown in, FIGS. 5(a) and 5(b).

This conventional precorrection system operates to effectively eliminate intermodulation products which are close to a visual carrier. These products formed by the action of the color carrier are typically the most visible as distortion, in the television receiver. However, such a conventional precorrection operation does not operate to effectively correct for higher frequencies areas of the passband (high frequency video) because of phase non-linearities across certain high power amplification stage(s). As a result, the output of this precorrection operation at the output of the IM Precorrector 15 is as is shown in FIGS. 5(a) and 5(b).

Figure 5A:
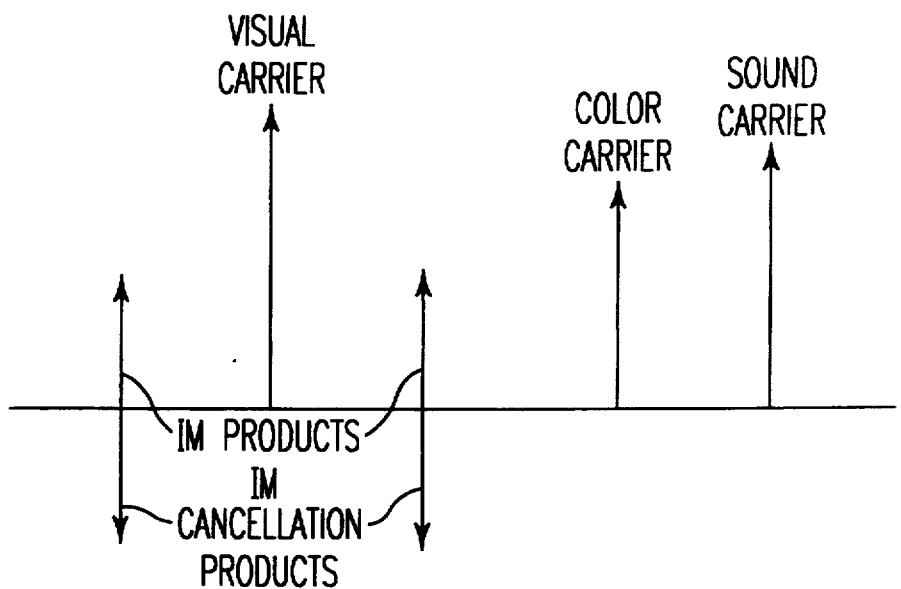
FIGS. 5(a), 5(b) and 6 explain the operation of the embodiments shown in FIGS. 3 and 4.

AS is shown in FIG. 5(a), IM products are formed about the visual carrier as a result of the interaction between the color and sound carriers. Further, as is also shown in FIG. 5(b), an IM product is formed in the area of the sound carrier as a result of the interaction between the visual carrier and the modulating signals. The IM products formed in the area of the sound carrier as shown in FIG. 5(b) represent the in-band intermodulation products of low frequency video signals, which when modulated correspond to the high end of the video sideband region. Phase non-linearity in amplifiers in the television signal transmission system will slightly phase shift the high frequency IM products, i.e. the IM products formed in the region of the sound carrier shown in FIG. 5(b). The conventional corrective circuitry cannot effectively cancel such IM products formed in the area of the sound carrier.

More particularly, the operation of the conventional pre-correction circuitry can correct for the IM products developed in the region of the visual carrier by generating opposite phase IM cancellation signals at the same frequencies as the IM products, see FIG. 5(a). However, IM products are also be formed in the region of the sound carrier, see FIG. 5(b). Further, these IM products formed in the region of the sound carrier will not be effectively cancelled because of phase non-linearities in amplification stages of the television transmitter. That is, the conventional pre-correction circuitry will correct for the IM products about the visual carrier by generating IM cancellation products which are opposite in phase to the generated IM products, such as is shown in FIG. 5(a).

Figure 5B:
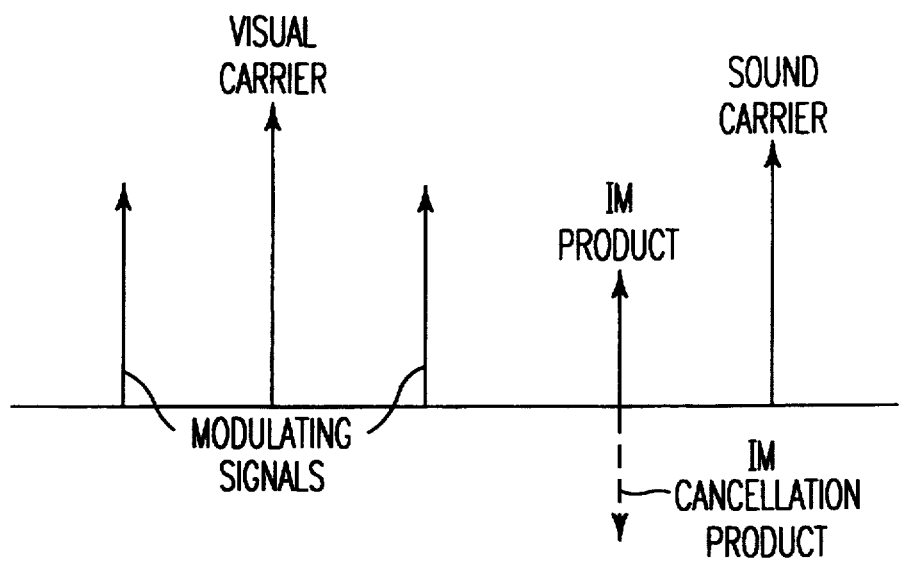

However, the IM products which are generated about the sound carrier, which IM products correspond to low frequency video sideband signals, will be s lightly shifted in phase because of the phase non-linearity of certain television amplifier stage(s), and thereby will not be cancelled by the IM cancellation products about the sound carrier, such as shown in FIG. 5(b) (the dotted line of the formed IM cancellation product indicating that the IM product and the IM cancellation signal are not opposite in phase). In this way, the conventional circuitry does not operate to effectively cancel the IM products which are formed in the region of the sound carrier.

The circuitry of the present invention is directed to a system which can cancel such IM products formed in the area of the sound carrier. The operation of the present invention results in that such IM products formed in the area of the sound carrier are cancelled by phase shifting the IM cancellation signal formed at the same frequency as the IM product formed about the sound carrier. That is, the system of the present invention operates to phase shift the IM cancellation signals formed in thee area of the sound carrier so that the IM cancellation signals are at an opposite phase as the generated IM products, to thereby cancel out the generated IM products. Then, when the IM cancellation signal is selectively phase-shifted by the intermodulation correction circuitry of the present invention, and in combination with the IM cancellation product signals shown in FIG. 5(a) resulting from the conventional correction circuitry, all IM products, including those formed in the area of the sound carrier, can be cancelled.

To achieve this objective, in the present invention the video input which is input into the IF Modulator and SAW Filter 5 is also input into a SAW Filter Delay Equalizer 20, as is shown in FIG. 3. The present invention is only concerned with the video input as it is the video input signal which when modulated generates thee high-frequency IM products in the region of the sound carrier. The SAW Filter Delay Equalizer 20 is a conventional device, and is a conventional video delay line typically with a delay of approximately 4 μsec. The SAW Filter Delay Equalizer 20 operates to insure that the signals input into subsequent phase modulator 35 are applied at an appropriate time.

The output from the SAW Filter Delay Equalizer 20 is then input into a Low Pass Filter 25. This Low Pass Filter 25 will typically have a cutoff frequency of between 1 and 2 MHz. By having such a cutoff frequency, the Low Pass Filter 25 limits that part of the signal to which the selective correction operation of the present invention is to operate to low frequency video signals, which when modulated correspond to the high frequency video sideband pre-distortion products formed in IM Precorrector 15. Further, such a Low Pass Filter 25 may be a conventional Bessel filter with a cutoff frequency between 1 and 2 MHz.

The output of this Low Pass Filter 25 is then input into a video amplifier 30, which allow modification of the video signal to match the produced phase distortion more closely, and video amplifier 30 operates to control the operation of phase modulator 35. The specific circuitry of the video amplifier 30 and phase modulator 35 are shown respectively in FIGS. 7 and 8.

Figure 7:
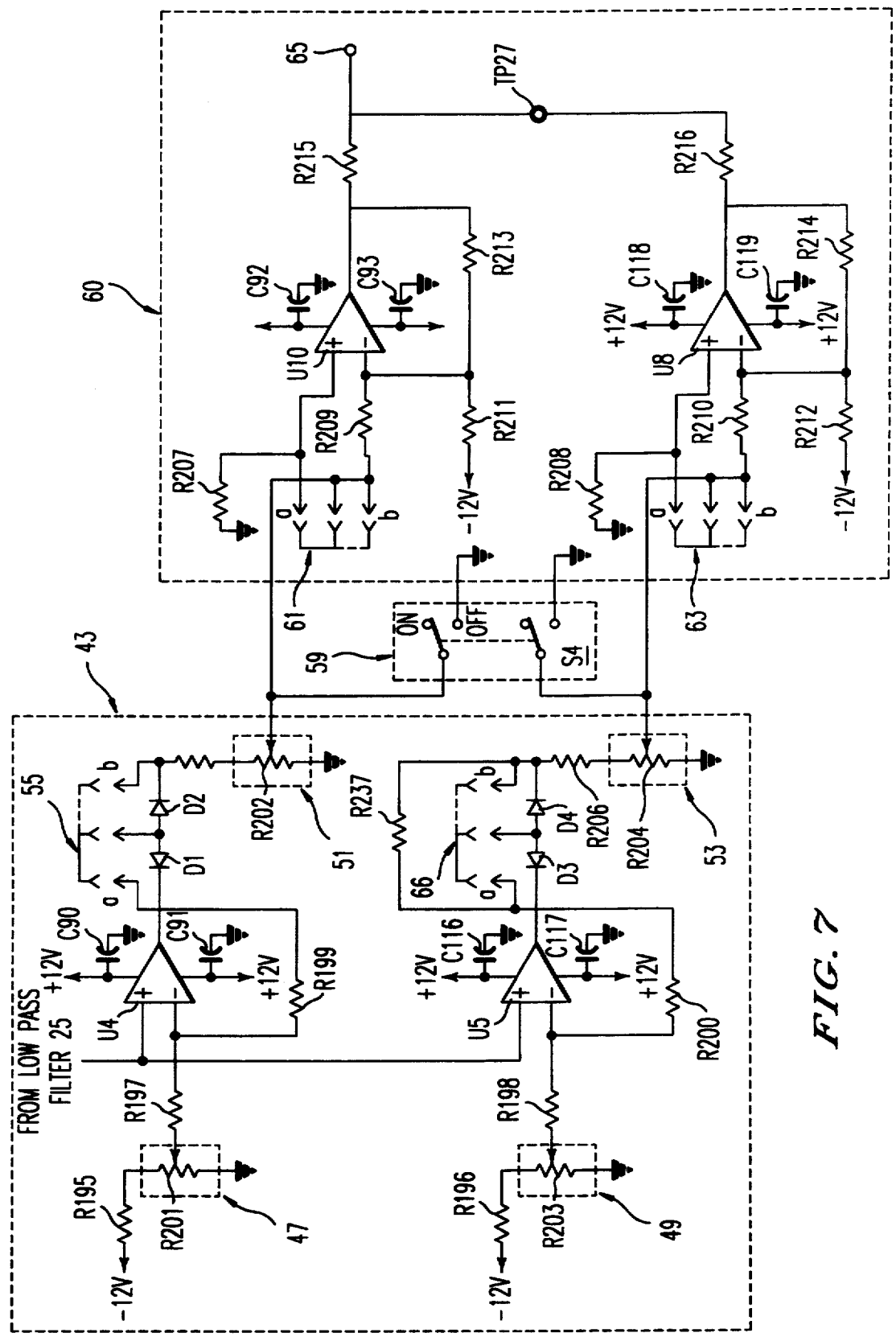
FIG. 7 shows the details of the video amplifier according to the present invention.

The output from the low pass filter 25 is input to the video amplifier 30 shown in FIG. 7, and more particularly to a video manipulation circuit 43 of the video amplifier 30. Video manipulation circuit 43 includes first and second amplifiers U4 and U5 each having an input potentiometer 47, 49 at one input thereof, respectively. The other input of amplifiers U4 and U5 is the output of low pass filter 25. The input potentiometers 47, 49 in conjunction with diodes D1 and D2 set threshold input points, i.e., clip points, at which the respective amplifier circuits see above or below the DC level set by these input potentiometers 47 and 49. It should be noted that each of the amplifiers U4 and U5 each have output potentiometers 51 and 53, respectively, which set the amplitude level at the output.

By the manipulation of input potentiometers 47, 49, the clip points of the video signal can be manipulated. That is, these input potentiometers 47, 49 can control which portions of the video signal will be passed through the selected diode D1, D2, D3 or D4. By manipulating potentiometers 51, 53, the amplitude of the output video signal can be controlled. The degree of the amplitude of the output video signal will operate to vary the amount of phase modulation induced by phase modulator 35, as will be discussed more below.

Amplifier U4 is also provided with a jumper 55 which permits selective connection of diodes D1 and D2 between the output 56 of amplifier U4 and the output potentiometer 51. This arrangement permits a technician to selectively fold the video signal outputted by amplifier U4 back upon itself in the next circuit portion 60 to further manipulate and modify the video signal. Amplifier U5 has similar circuitry of diodes D3 and D4, jumper 66 and output 67, with similar operations.

Further, video manipulation circuit 43 is connected to an output circuit 60 of the video amplifier 30 which controls the polarity of the non-linear video signal outputted thereby.

Outputs from amplifiers U4 and U5 of video manipulation circuit 43 are provided to inputs of respective amplifiers U10 and U8 of output circuit 60 via a switch 59, each of the amplifiers U10 and U8 having input jumpers 61, 63, respectively, connected to their inputs which permit selective folding of the composite signal provided to each of these amplifiers U10 and U8. Outputs of amplifiers U10) and U8 are connected to a non-linear output terminal 65 which is connected, for example, to a non-linear video input of the phase modulator 35, as will be described hereinafter. By operation of the jumpers 61 and 63, the combined outputs of amplifiers U10 and U8 can change the direction of the non-linear video signal outputted thereby. Therefore, the output circuit 60 including amplifiers U10 and U8 determines whether the output signal is positive going or negative.

In this way, the controlling of amplifiers U10 and U8 will determine whether the modulation induced by phase modulator 35 will be in a positive or a negative direction. That is, and as will be discussed more fully below, the phase modulator 35 will operate to phase shift the IM cancellation signal formed in the vicinity of the sound carrier, such as is shown in FIG. 5(b) of the present specification. By controlling amplifiers U10 and U8 as noted above, the direction in which this phase shift is induced can be controlled.

In this way, the video amplifier 30 shown in FIG. 7 operates to control the video signal output on output terminal 65, which is then input into the phase modulator 35. By controlling this video signal input into phase modulator 35, the amount of phase shift and the direction of phase shift of the IM cancellation signal formed in the area of the sound carrier, such as is shown in FIG. 5(b), can be controlled.

Further, the manipulation of the above-noted potentiometers and jumper circuits will be largely by a trial and error operation by the operator. That is, in the present invention the operator will have to find the appropriate settings for the above-noted potentiometers and jumpers on a trial and error method, to thereby find the appropriate settings which will effectively provide the cancellation of the IM products in the area of the sound carrier. It is the settings of the above-noted potentiometers and the above-noted jumpers which when varied will provide the appropriate phase modulation of the IM cancellation signal. That is, by appropriately manipulating the above-noted potentiometers and jumpers, the signal input into the phase modulator 35 can be set to provide the correct amount of phase shift and the correct direction of phase shift of the IM cancellation signal formed in the area of the sound carrier, to thereby effectively cancel the IM product in the area of the sound carrier.

Figure 8:
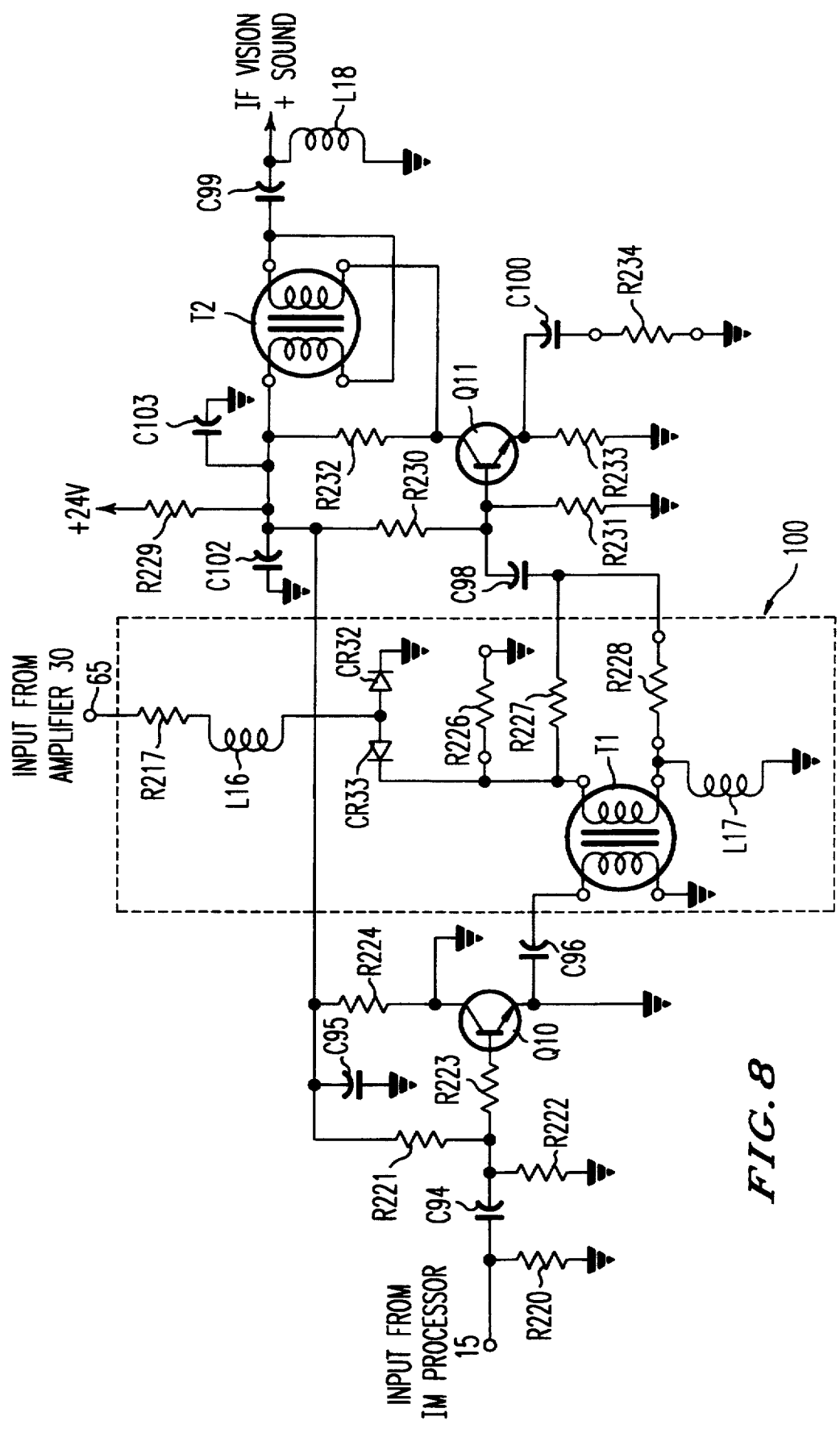
FIG. 8 shows the details of the phase modulator according to the present invention.

The output 65 of the video amplifier 30 is then input into phase modulator 35, as is shown in FIG. 8 of the present specification. Also input into phase modulator 35 is an output of the IM precorrector 15. The conventional precorrected signal input from the IM precorrector 15 is input into a transistor Q10 of phase modulator 35. The input from the amplifier 30 is also fed into the circuitry 100 of phase modulator 35, which is the modulating circuitry of the phase modulator 35. A further transistor Q11 is also provided in the circuit. Both transistors Q10 and Q11 are amplifier/isolator devices which work in conjunction with the phase modulator circuitry 100. Transistor Q10 is configured in a common collector circuit. The output from the emitter of transistor Q10 is applied to a transformer T1 which is a part of the modulator circuit 100 of phase modulator 35.

The input from video amplifier 30 is applied to a junction of diodes D32 and D33, after IF isolation is provided by resistor R217 and inductor L16. Based on this input from video amplifier 30, the signal input from IM precorrector 15 will be modified in phase. The resulting signal is then input to transistor Q11. Transistor Q11 is in a common emitter configuration and has a modifiable gain to compensate for any previous circuit losses. This modifiable gain is set by appropriate selecting of the value of resistor R231. That is, by a trial-and-error method an operator of the present invention will select the resistor R231 to an appropriate value to compensate for any circuit losses provided by phase modulator 35. A further transformer T2 is also connected to transistor Q11, and this transformer T2 provides an impedance matching.

As a result, the output of this phase modulator 35 is a fully phase corrected IF signal, which can then be applied to the converter/transmitter 40.

Figure 6:
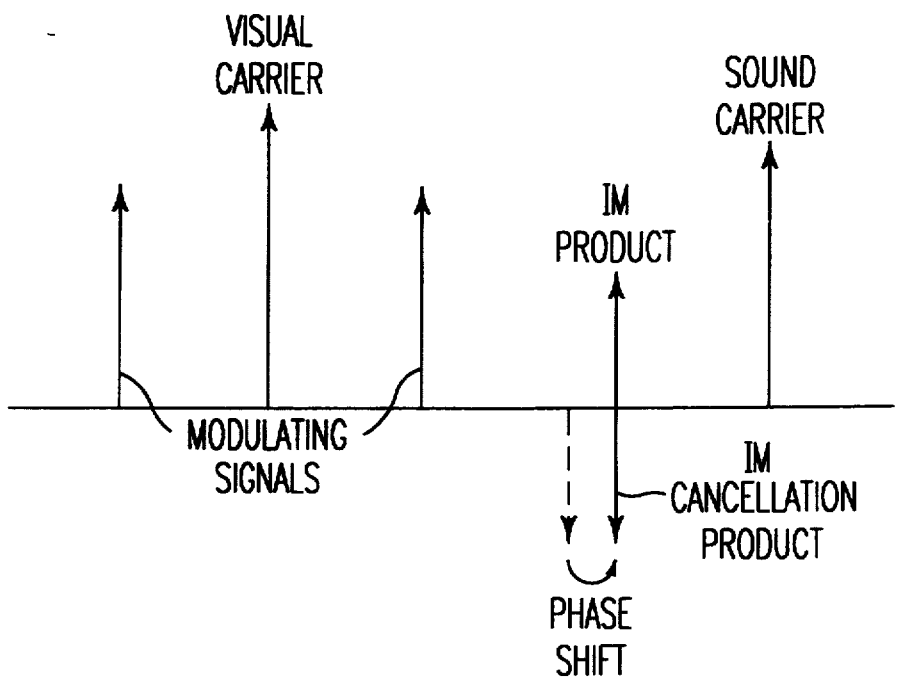

The video amplifier 30 and the phase modulator 35 thus operate to phase shift the intermodulation cancellation product which is shown in FIG. 5(b) and which is generated by the precorrection circuitry such as is shown in FIG. 3. As is shown in FIG. 6, the video amplifier 30 and phase modulator 35 operate to phase modulate the television passband causing only precorrection intermodulation products near the sound carrier (caused by low frequency video sideband modulating signals surrounding the vision carrier) to be phase shifted.

In this way, the device shown in FIG. 3 operates to cancel the IM products associated with the high end of the video sideband region, i.e., the IM products formed in the region of the sound carrier.

As discussed above, and as is also shown in FIG. 3, the Phase Modulator 35 also receives an output from the IM Precorrector 15. That is, the phase modulator 35 also receives the conventionally corrected signal shown in FIGS. 5(a) and 5(b). By phase shifting the conventionally corrected signal shown in FIG. 5(b), so that the IM cancellation signal about the sound carrier is opposite in phase to the generated IM product at the same frequency, the IM correction signal, as shown in FIG. 6, eliminates the IM products about the sound carrier, and thereby IM products throughout the entire television channel can be substantially reduced.

The output of the phase modulator 35 is then input into a converter/transmitter 40. This converter/transmitter 40 translates the television IF signal to an on-channel frequency signal. This resulting signal is then sent to further conventional amplification stage(S), which may be an inductive output tube, vacuum tube, tetrode, klystron, solid state, etc. and is then conventionally radiated.

Figure 4:
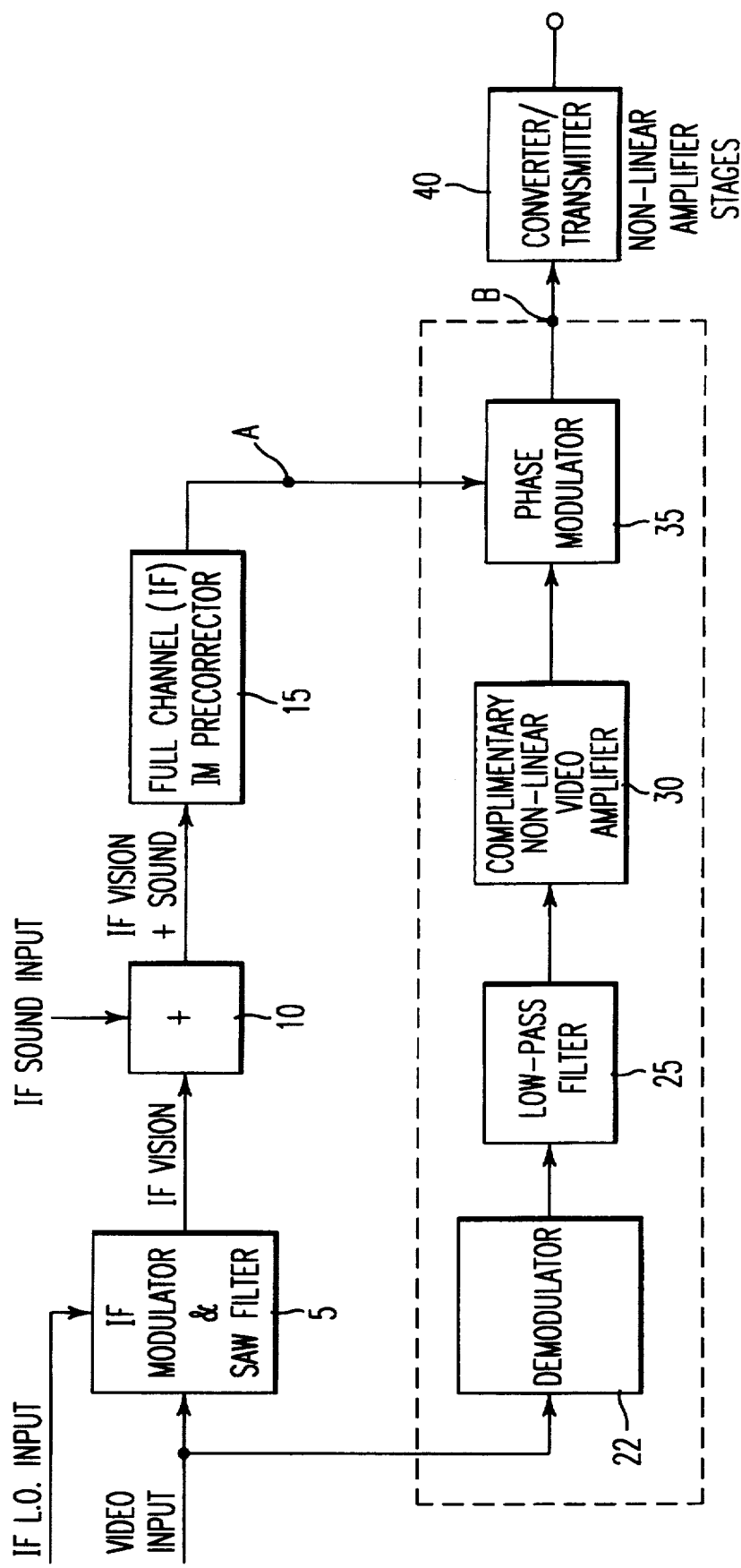
FIG. 4 shows a second embodiment of the intermodulation correction system of the present invention.

FIG. 4 shows a second embodiment of the present invention which is similar to that of the first embodiment of the present invention of FIG. 3 except that a Demodulator 22 is employed in place of the SAW Filter Delay Equalizer 20. However, the remaining operation of the second embodiment shown in FIG. 4 is the same as that of the first embodiment shown in FIG. 3. Further, the overall operation of the device shown in FIG. 4 has same operation as the device shown in FIG. 3. The Demodulator 22 operates to receive the output of the IF Modulator and SAW Filter 5, and to demodulate the IF vision signal output from the IF Modulator and SAW Filter 5 to generate the video input, rather than directly receiving the video input as in the embodiment shown in FIG. 3.

The specific circuitry detailed for the video amplifier 30 and phase modulator 35 described above are just examples of circuitry which can be used in the present invention. That is, video amplifiers and phase modulators with slightly different constructions, but which perform the same overall functions as discussed above, can also be employed in the present invention.

Also, the present invention has detailed an operation in which IM products formed about the sound carrier, which IM products correspond to low frequency video sideband signals when modulated, are corrected for. This operation of the present invention results because in conventional television transmitter circuitry, a phase non-linearity in a television transmitter will phase shift such low frequency video sideband signals. However, it is possible that a television transmitter will operate so that the low frequency video sideband signals will not be phase shifted, but that instead a phase non-linearity will occur in high frequency video sideband signals. In such a situation, the IM products formed about the sound carrier can be effectively cancelled, but the IM products formed about the vision carrier will not be effectively cancelled due to the phase non-linearity. In this situation, the system of the present invention could be modified to phase shift the IM cancellation products formed about the vision carrier, to effectively cancel the IM products formed about the vision carrier.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An intermodulation correction system comprising:
   a video input for receiving an input video signal;
   a modulator for modulating the input video signal with at least one modulating signal;
   a sound input for receiving an input sound signal;
   an adder for adding the modulated video signal with the sound signal to generate a resulting television signal;
   a first amplifier for amplifying the resulting television signal, and thereby generating IM products about the sound signal at predetermined frequencies from an interaction of the video signal, modulating signals and sound signal;
   correcting means for generating an IM cancellation signal at the predetermined frequencies and of an equal amplitude as at least one of the generated IM products;
   a low pass filter for receiving the input video signal and for low pass filtering the input video signal;
   a second amplifier for amplifying the low-pass filtered video signal output from the low pass filter to generate an amplified video signal; and
   a phase modulator for receiving the amplified video signal from the second amplifier and the IM cancellation signal from the correcting means, and for shifting a phase of the IM cancellation signal to be opposite in phase to the at least one generated IM product based on the amplified video signal, to thereby cancel the at least one generated IM product.

2. The intermodulation correction system according to claim 1, further comprising a SAW filter delay equalizer for receiving the video input signal.

3. The intermodulation correction system according to claim 1, further comprising a demodulator for receiving an output of the modulator and for demodulating the modulated output video signal to generate the video signal input to the low-pass filter.

4. The intermodulation correction system according to claim 1, wherein the low-pass filter has a cut-off frequency between 1 and 2 MHz.

5. The intermodulation correction system according to claim 2, wherein the low-pass filter has a cut-off frequency between 1 and 2 MHz.

6. The intermodulation correction system according to claim 3, wherein the low-pass filter has a cut-off frequency between 1 and 2 MHz.

7. An intermodulation correction system comprising:
   a video input for receiving an input video signal;
   a modulator means for modulating the input video signal with at least one modulating signal;
   a sound input for receiving an input sound signal;
   an adding means for adding the modulated video signal with the sound signal to generate a resulting television signal;
   a generating means for generating IM products about the sound signal at predetermined frequencies from an interaction of the video signal, modulating signals and sound signal;
   precorrecting means for generating an IM cancellation signal at the predetermined frequencies and of an equal amplitude as at least one of the generated IM products;
   a low pass filter means for receiving the input video signal and for low pass filtering the input video signal;
   an amplifier means for amplifying the low-pass filtered video signal output from the low pass filter to generate an amplified video signal; and
   a phase modulator means for receiving the amplified video signal from the amplifier and the IM cancellation signal from the precorrecting means, and for shifting a phase of the IM cancellation signal to be opposite in phase to the at least one generated IM product based on the amplified video signal, to thereby cancel the at least one generated IM product.

8. The intermodulation correction system according to claim 7, further comprising a SAW filter delay equalizer for receiving the video input signal.

9. The intermodulation correction system according to claim 7, further comprising a demodulator for receiving an output of the modulator and for demodulating the modulated output video signal to generate the video signal input to the low-pass filter.

10. The intermodulation correction system according to claim 7, wherein the low-pass filter has a cut-off frequency between 1 and 2 MHz.

11. The intermodulation correction system according to claim 8, wherein the low-pass filter has a cut-off frequency between 1 and 2 MHz.

12. The intermodulation correction system according to claim 9, wherein the low-pass filter has a cut-off frequency between 1 and 2 MHz.

13. An intermodulation correction system comprising:
   a generator for generating a television signal including a video signal, a sound signal, and a modulating signal;
   a generating means generating IM products about the sound signal at predetermined frequencies from an interaction of the video signal, modulating signal and sound signal;
   precorrecting means for generating an IM cancellation signal at the predetermined frequencies and of an equal amplitude as at least one of the generated IM products;
   an amplifier for amplifying at least a selected portion of the television signal to generate an amplified signal; and
   a phase modulator for receiving the amplified signal from the amplifier and the IM cancellation signal from the precorrecting means, and for shifting a phase of the IM cancellation signal to be opposite in phase to the at least one generated IM product based on the amplified signal, to thereby cancel the at least one generated IM product.

14. The intermodulation correction system according to claim 13, further comprising a filter for receiving the television signal and for filtering the television signal to output the at least selected portion of the television signal to the second amplifier.

15. The intermodulation correction system according to claim 14, wherein the filter comprises a low-pass filter.

* * * * *